(12) United States Patent
Coppola et al.

(10) Patent No.: US 11,713,803 B1
(45) Date of Patent: Aug. 1, 2023

(54) CARBON FIBER COMPOSITE DRIVE UNIT HOUSINGS FOR ELECTRIC VEHICLES

(71) Applicant: GM GLOBAL TECHNOLOGY OPERATIONS LLC, Detroit, MI (US)

(72) Inventors: Anthony Michael Coppola, Rochester Hills, MI (US); Derek Frei Lahr, Howell, MI (US); Alireza Fatemi, Canton, MI (US); Alan G. Holmes, Clarkston, MI (US); Bradley Allen Newcomb, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/732,714

(22) Filed: Apr. 29, 2022

(51) Int. Cl.
 *F16H 57/02* (2012.01)
 *H02K 5/02* (2006.01)
 *F16H 57/032* (2012.01)

(52) U.S. Cl.
 CPC ............ *F16H 57/032* (2013.01); *H02K 5/02* (2013.01); *F16H 2057/02034* (2013.01)

(58) Field of Classification Search
 CPC ................ F16H 57/021; F16H 57/032; F16H 2057/02034; F16H 2057/0325; H02K 5/02; H02K 5/04; H02K 5/173
 See application file for complete search history.

(56) References Cited

U.S. PATENT DOCUMENTS

| | | | | |
|---|---|---|---|---|
| 5,156,069 A | * | 10/1992 | Bitsch | F16C 35/067 384/441 |
| 5,832,789 A | * | 11/1998 | Kinto | H02K 7/116 74/421 A |
| 10,001,209 B2 | | 6/2018 | Kia et al. | |
| 10,280,974 B2 | | 5/2019 | Newcomb et al. | |
| 10,371,257 B2 | * | 8/2019 | Kume | H02K 11/33 |
| 10,451,154 B2 | * | 10/2019 | Kouno | H02K 5/225 |
| 10,637,321 B1 | | 4/2020 | Newcomb et al. | |
| 10,666,099 B1 | | 5/2020 | Fatemi et al. | |
| 10,854,933 B2 | | 12/2020 | Hao et al. | |
| 10,923,287 B1 | | 2/2021 | Coppola et al. | |
| 10,923,969 B2 | | 2/2021 | Fatemi et al. | |
| 10,940,771 B1 | | 3/2021 | Fatemi et al. | |
| 11,043,875 B2 | | 6/2021 | Fatemi et al. | |
| 11,104,042 B2 | | 8/2021 | Newcomb et al. | |
| 11,147,193 B2 | | 10/2021 | Coppola et al. | |
| 11,171,545 B2 | | 11/2021 | Coppola et al. | |
| 11,207,982 B2 | | 12/2021 | Liu et al. | |

(Continued)

FOREIGN PATENT DOCUMENTS

| | | | | |
|---|---|---|---|---|
| EP | 1068926 A1 | * | 1/2001 | ............ B23P 11/025 |
| EP | 4001701 A1 | * | 5/2022 | |

(Continued)

OTHER PUBLICATIONS

Machine translation of EP 1068926 A1 obtained on Jan. 10, 2023.*

*Primary Examiner* — Adam D Rogers

(57) ABSTRACT

An electric motor drive unit including an electric motor having an output shaft and a plurality of gears in driving engagement with the output shaft. The plurality of gears being supported by a plurality of laterally spaced bearings. A composite housing member includes a structural support skeleton supporting multiple ones of the plurality of laterally spaced bearings and a composite shell molded to the structural support skeleton.

17 Claims, 4 Drawing Sheets

(56) References Cited

U.S. PATENT DOCUMENTS

| | | | |
|---|---|---|---|
| 11,223,252 B2 | 1/2022 | Coppola et al. | |
| 11,300,193 B2 * | 4/2022 | Li | F16H 63/3466 |
| 11,309,766 B2 | 4/2022 | Yang et al. | |
| 11,323,001 B2 | 5/2022 | Nehl et al. | |
| 11,465,488 B2 * | 10/2022 | Li | H02K 5/203 |
| 2010/0170355 A1 * | 7/2010 | Kume | F16H 61/32 |
| | | | 29/428 |
| 2019/0357386 A1 | 11/2019 | Coppola et al. | |
| 2019/0363598 A1 | 11/2019 | Coppola et al. | |
| 2020/0103179 A1 | 4/2020 | Coppola et al. | |
| 2020/0162005 A1 | 5/2020 | Fatemi et al. | |
| 2020/0195071 A1 | 6/2020 | Fatemi et al. | |
| 2021/0036643 A1 | 2/2021 | Wang et al. | |
| 2021/0040608 A1 | 2/2021 | Coppola et al. | |
| 2021/0083555 A1 | 3/2021 | Lahr et al. | |
| 2021/0099034 A1 | 4/2021 | Fatemi et al. | |
| 2021/0101326 A1 | 4/2021 | Newcome | |
| 2021/0162672 A1 | 6/2021 | Coppola et al. | |
| 2021/0162688 A1 | 6/2021 | Coppola et al. | |
| 2021/0162689 A1 | 6/2021 | Coppola | |
| 2021/0195808 A1 | 6/2021 | Liu et al. | |
| 2021/0211025 A1 | 7/2021 | Lahr et al. | |
| 2021/0237587 A1 | 8/2021 | Nehl et al. | |
| 2021/0242691 A1 | 8/2021 | Hao et al. | |
| 2021/0336510 A1 | 10/2021 | Yang et al. | |
| 2022/0272896 A1 * | 9/2022 | Kiyooka | A01D 34/78 |
| 2023/0006498 A1 * | 1/2023 | Makino | H02K 7/003 |

FOREIGN PATENT DOCUMENTS

| | | | |
|---|---|---|---|
| FR | 2345634 A1 * | 10/1977 | |
| GB | 2561804 A * | 10/2018 | F16H 57/02 |

\* cited by examiner

CARBON FIBER COMPOSITE DRIVE UNIT HOUSINGS FOR ELECTRIC VEHICLES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a composite shell drive unit housing with structural support skeleton.

In electric vehicle drive units, bearing loads are very high. Housing stiffness between the bearings is required for maintaining gear alignment, proper gear meshing and reducing noise and vibration. Current structural housings are formed from cast aluminum. It is desirable to provide a housing for an electric vehicle drive unit with reduced weight and improved noise, vibration and harshness (NVH).

SUMMARY

According to an aspect of the present disclosure, an electric motor drive unit including an electric motor having an output shaft and a plurality of gears in driving engagement with the output shaft. The plurality of gears being supported by a plurality of laterally spaced bearings. A composite housing member includes a structural support skeleton supporting multiple ones of the plurality of laterally spaced bearings and a composite shell molded to the structural support skeleton.

A method of making a composite housing member for a drive unit includes forming a structural support skeleton including a plurality of annular bearing support portions laterally spaced from one another and including a first plurality of structural connecting portions connecting the plurality of annular bearing support portions. A composite shell is molded to the structural support skeleton.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
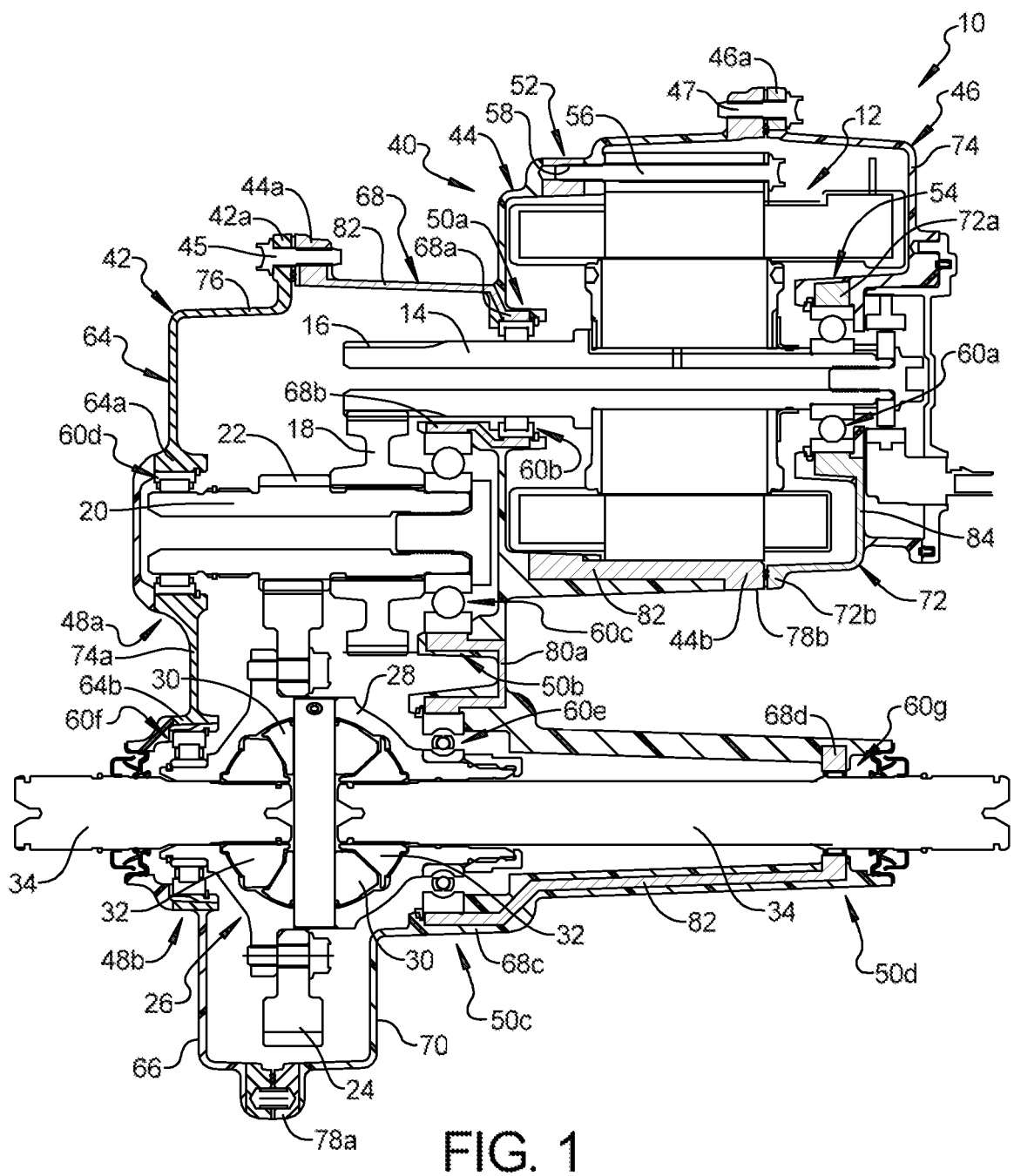
FIG. 1 is a cross sectional view of an example embodiment of an electric motor drive unit having a housing with a structural skeleton and an over-molded composite shell.

With reference to FIG. 1, an example embodiment of an electric motor drive unit 10 will now be described. The electric motor drive unit 10 includes an electric motor 12 having an output shaft 14 with a drive gear 16. The drive gear 16 is in meshing engagement with a first gear 18 mounted on an intermediate shaft 20. The intermediate shaft 20 includes a driving pinion 22 that is in driving engagement with a crown wheel 24 of a differential unit 26. The differential unit 26 includes a differential case 28 connected to the crown wheel 24 and that supports a pair of spider gears 30 that are in meshing engagement with a pair of side gears 32 that are attached to a pair of axle shafts 34.

The electric motor drive unit 10 includes a housing 40 having a first housing part 42, a second housing part 44 mounted to the first housing part 42 and a third housing part 46 mounted to the second housing part 44. The first housing part 42 includes a mounting flange 42a and a pair of bearing support portions 48a, 48b.

The second housing part 44 includes a first mounting flange 44a and a second mounting flange 44b, the first mounting flange 44a of the second housing part 44 being mounted to the mounting flange 42a of the first housing part 42 by a plurality of bolts 45. The second housing part 44 further includes a first bearing support portion 50a, a second bearing support portion 50b, a third bearing support portion 50c and a fourth bearing support portion 50d. The second housing part 44 further includes a motor mounting portion 52

The third housing part 46 includes a mounting flange 46a that is mounted to the second mounting flange 44b of the second housing part 44 by a plurality of bolts 47. The third housing further includes a bearing support portion 54.

The electric motor 12 is mounted to the motor mounting portion 52 of the second housing part 44 by a plurality of bolts 56 engaged with a plurality of threaded apertures 58. The output shaft 14 of the electric motor is supported at a first end by a first bearing assembly 60a that is supported by the bearing support portion 54 of the third housing part 46. A second end of the output shaft 14 is supported by a second bearing assembly 60b that is supported by the first bearing support portion 50a of the second housing part 44. The intermediate shaft 20 is supported at a first end by a third bearing assembly 60c that is supported by the second bearing support portion 50b of the second housing part 44. A second end of the intermediate shaft 20 is supported by a fourth bearing assembly 60d that is supported by the bearing support portion 48a of the first housing part 42. The cage 28 of the differential unit 26 is supported at a first end by a fifth bearing assembly 60e that is supported by the third bearing support portion 50c of the second housing part 44. A second end of the cage 28 is supported by a sixth bearing assembly 60f that is supported by the bearing support portion 48b of the first housing part 42. An end portion of the axle shaft 34 is supported by a seventh bearing assembly 60g that is supported by the fourth bearing support portion 50d of the second housing part 44.

Figure 2:
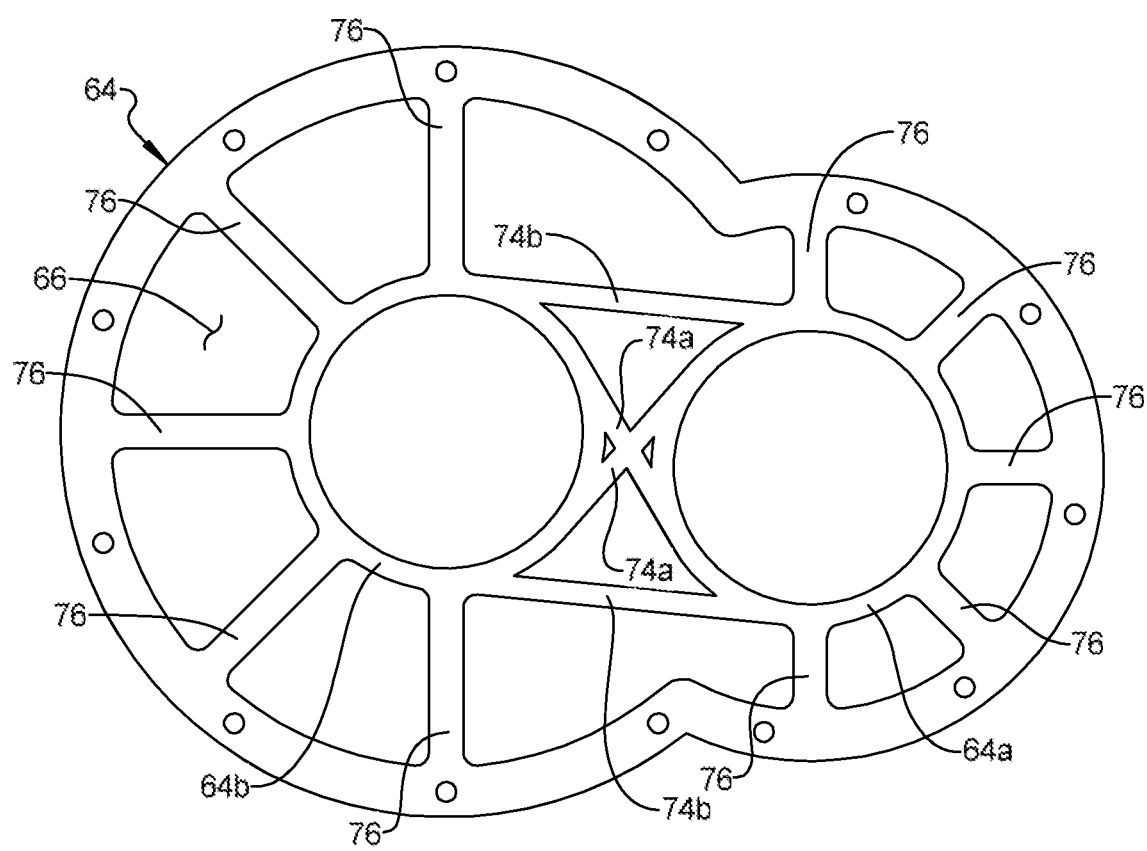
FIG. 2 is a schematic view of an example embodiment of a first housing portion having a structural skeleton and an over-molded composite shell according to the principles of the present disclosure.
Figure 3:
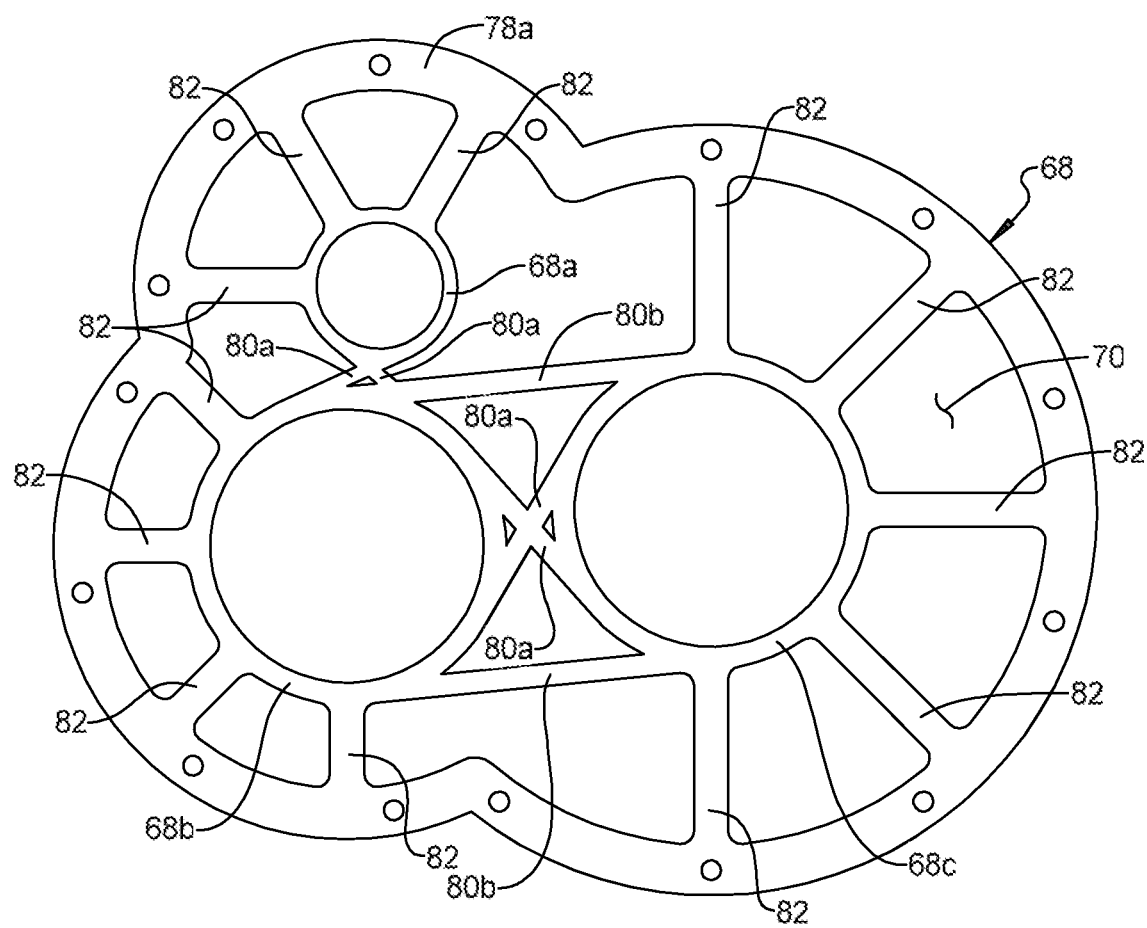
FIG. 3 is a schematic view of an example embodiment of a second housing having a structural skeleton and an over-molded composite shell according to the principles of the present disclosure.
Figure 4:
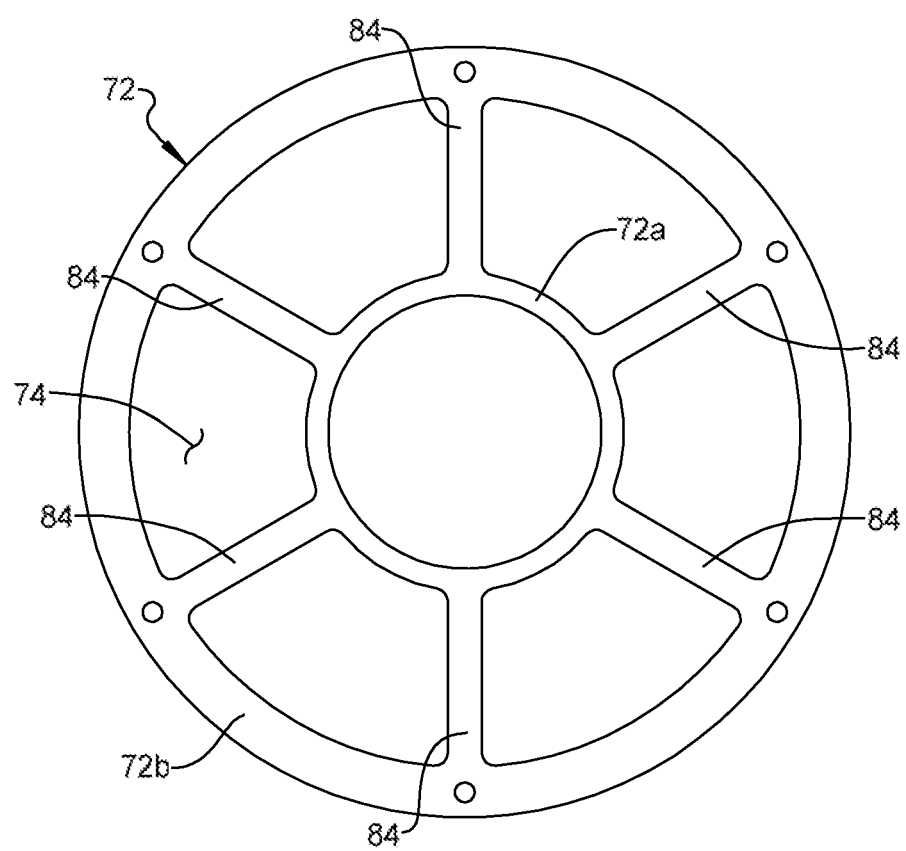
FIG. 4 is a schematic view of an example embodiment of a third housing having a structural skeleton and an over-molded composite shell according to the principles of the present disclosure.

With reference to FIGS. 1 and 2, the first housing part 42 includes a structural support skeleton 64 and a composite portion 66 molded to the structural support skeleton 64. With reference to FIGS. 1 and 3, the second housing part 44 includes a structural support skeleton 68 and a composite portion 70 molded to the structural support skeleton 68. With reference to FIGS. 1 and 4, the third housing part 46 includes a structural support skeleton 72 and a composite shell 74 molded to the structural support skeleton 72. The structural support skeletons 64, 68 and 72 can be formed from a metal material including, but not limited to cast iron, aluminum and magnesium or from a continuous fiber composite material. The composite portion 66 can be formed from a polymer composite that can include carbon fiber, glass fiber, basalt, silicon carbide, boron, Kevlar and Dyneema. Other composite materials can include a thermoset including epoxy, bismaleimide, benzoxazine, unsaturated polyester, polyurethane, vinyl ester, cyanate ester, polyimide or a thermoplastic such as PPA, PPS, PA, PP, PL and PEI. When the structural support skeleton 64, 68, 72 is formed from a continuous fiber composite material, the continuous fibers are oriented along a length or loading path of the structure. Various methods exist for creating composites with controlled fiber architectures in complex geometries, including the Arris Composites process, tailored fiber placement (TFP) and CESAM from Hutchinson. These methods can be used to create the continuous fiber structural support skeleton which can then be placed in a mold for receiving the shell 74. It is also possible to form the shell 74 and apply the structural support skeleton 64, 68, 72 to the shell 74 within preformed tracks formed in the shell 74.

According to an aspect of the present disclosure, a continuous fiber skeleton element can be disposed within the reinforcement ribs. For example, having a cord of continuous carbon fiber along a top edge of the ribs.

It should be noted that the thermal expansion coefficients of the materials of the structural support skeletons 64, 68, 72 and the shell 74 should be taken into account in order to avoid separation. A mix of materials can be used to match a thermal expansion of a third material. For example, aluminum and carbon fiber can be structurally coupled around an iron-based bearing to match the thermal expansion of that bearing. In addition, aluminum and other metals galvanically corrode when in contact with carbon fiber composites. Accordingly, methods can be used to isolate the materials electrically such as, but not limited to coat the aluminum with a polymer, anodize the aluminum, and adding a glass fiber layer at the surface of the composite where it contacts the metal.

In addition, the drive unit housings are used to shield EMI and provide electrical grounding. Accordingly, a nickel fiber veil can be added to the composite or the surface of the shell can be coated with a metal or a foil can be added to the surface. Further, a grounding conductor can be embedded in the composite or added to its surface. The EMI shield itself can be used to impart some stiffness to the system if it is structurally bonded to the housing.

The structural support skeletons 64, 68 and 72 are designed to link structural loading points together. Accordingly, the structural support skeleton 64 of the first housing part 42 includes a pair of annular portions 64a, 64b disposed in a respective one of the bearing support portions 48a, 48b and a reinforcement portion 64c in the mounting flange 42a of the first housing part 42.

As shown in FIG. 2, a plurality of structural connecting portions 74a, 74b extend between the pair of annular portions 64a, 64b. The plurality of structural connecting portions 74a, 74b can extend tangentially from the annular portions 64a, 64b, while the structural connecting portions 74a extend diagonally between the annular portions 64a, 64b, the structural connecting portions 74b are provided on opposite sides of the annular portions 64a, 64b. A plurality of structural connecting portions 76 can extend from the annular portions 64a, 64b to the reinforcement portion 64c. The plurality of structural connecting portions 76 can extend like spokes from the annular portions 64a, 64b. The thickness and number of structural connecting portions 74a, 74b, 76 and additional cross bracing can be determined based upon the structural requirements of the housing.

With reference to FIG. 1, the structural support skeleton 68 of the second housing part 44 includes a first annular portion 68a, a second annular portion 68b, a third annular portion 68c and a fourth annular portion 68d disposed in a respective one of the bearing support portions 50a, 50b, 50c, 50d. The structural support skeleton 68 further includes a first reinforcement portion 78a in the first mounting flange 44a of the second housing part 44 and a second reinforcement portion 78b in the second mounting flange 44b of the second housing part 44.

As shown in FIG. 3, a plurality of structural connecting portions 80a, 80b extend between the annular portions 68a, 68b, 68c, 68d. The plurality of structural connecting portions 80a, 80b can extend tangentially from the annular portions 68a, 68b, 68c, 68d while the structural connecting portions 80a extend diagonally between the annular portions 68a, 68b, 68c, 68d the structural connecting portions 80b are provided on opposite sides of the annular portions 68b, 68c. A plurality of structural connecting portions 82 can extend from the annular portions 68a, 68b, 68c, 68d to the reinforcement portions 78a, 78b. The plurality of structural connecting portions 82 can extend like spokes from the annular portions 64a, 64b. The thickness and number of structural connecting portions 80a, 80b, 82 and additional cross bracing can be determined based upon the structural requirements of the housing. It is noted that the structural connecting portions 82 that connect the annular portion 68c to the annular portion 68d and that connect the annular portion 68a to the reinforcement portion 78b extend at least in part in a longitudinal direction.

With reference to FIG. 1, the structural support skeleton 72 of the third housing part 46 includes an annular portion 72a disposed in the bearing support portion 54 and a reinforcement portion 72b in the mounting flange 46a.

As shown in FIG. 4, a plurality of structural connecting portions 84 extend between the annular portion 72a and the reinforcement portions 72b. The plurality of structural connecting portions 84 can extend like spokes from the annular portions 64a, 64b. The thickness and number of structural connecting portions 84 and additional cross bracing can be determined based upon the structural requirements of the housing.

The structural support skeletons 64, 68, 72 can be formed using casting, printing, machining, welding or other appropriate techniques. If using adhesion between the skeleton and shell, the skeleton 64, 68, 72 is cleaned to remove organic and non-organic contaminants. Then, a bonding agent can be applied to the skeleton such as an epoxy primer, a silane or chemical conversion treatment such as Alodine. Alternatively, the surface can be sandblasted, abraded, or laser etched. Next, the skeleton 64, 68 and 72 is placed in a mold and overmolded with polymer. As the polymer cures, it is bonded to the skeleton. This avoids the potential for leakage paths for fluids and improves structural load transfer. Intermediate coatings may be provided to promote bonding. The shell 74 may enclose the skeleton such that the skeleton is structurally bound within it. Alternatively, the skeleton can be on a surface of the shell and bonded in place or the skeleton can be interlocked into the shell or can be provided with surface roughness to promote bonding. The shell 74 may contain ribs to help with local stiffness and reduce noise, vibration and harshness (NVH). Gasket flanges, bearing bores, threaded regions and other areas requiring machining and high dimensional accuracy should be formed by the structural support skeletons 64, 68, 72.

The structural support skeletons 64, 68 and 72 can be used to reinforce the area directly between bearings to ensure dimensional accuracy and stiffness of the multiple axes of the drive unit. Dimensional accuracy and stiffness are critical to correct alignment of the two gears of any gear pair, where the gear pair is split across two axes. The skeletons 64, 68 and 72 can take on a variety of shapes and are provided to allow weight reduction with sacrificing dimensional accuracy and stiffness.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. An electric motor drive unit, comprising:
an electric motor having an output shaft;
a plurality of gears hi driving engagement with the output shaft, the plurality of gears being supported by a plurality of laterally spaced bearings;
a composite housing member having a structural support skeleton supporting multiple ones of the plurality of laterally spaced bearings and a composite shell molded to the structural support skeleton, wherein the structural support skeleton includes a plurality of annular portions surrounding the multiple ones of the plurality of laterally spaced bearings and a first plurality of structural connecting portions connecting the plurality of annular portions.

2. The electric motor drive unit according to claim 1, wherein the structural support skeleton is made from metal.

3. The electric motor drive unit according to claim 1, wherein the structural support skeleton is made from a continuous fiber composite.

4. The electric motor drive unit according to claim 1, wherein a portion of the first plurality of structural connecting portions extend in a longitudinal direction between a pair of the plurality of annular portions.

5. The electric motor drive unit according to claim 1, wherein the composite housing member incudes a mounting flange and the structural support skeleton further includes a reinforcement portion that extends along the mounting flange of the composite housing member and the structural support skeleton further includes a second plurality of structural connecting portions connecting the reinforcement portion with the plurality of annular portions.

6. The electric motor drive unit according to claim 5, wherein the structural support skeleton is made from metal.

7. The electric motor drive unit according to claim 5, wherein the structural support skeleton is made from a continuous fiber composite.

8. The electric motor drive unit according to claim 1, wherein a pair of the first plurality of structural connecting portions extend tangentially from each of a pair of the plurality of annular portions.

9. The electric motor drive unit according to claim 8, wherein the pair of the first plurality of structural connecting portions extend diagonally between the pair of the plurality of annular portions.

10. The electric motor drive unit according to claim 8, wherein the pair of the first plurality of structural connecting portions are on opposite sides of the pair of the plurality of annular portions.

11. A method of making a composite housing member for a drive unit, comprising:
forming a structural support skeleton including a plurality of annular bearing support portions laterally spaced from one another and including a first plurality of structural connecting portions connecting the plurality of annular bearing support portions; and
molding a composite shell to the structural support skeleton.

12. The method according to claim 11, wherein the forming a structural support skeleton includes forming the structural support skeleton from a metal.

13. The method according to claim 11, wherein the forming a structural support skeleton includes forming the structural support skeleton from a continuous fiber composite.

14. The method according to claim 11, wherein the forming a structural support skeleton includes forming a reinforcement portion defining a mounting flange of the composite housing member and the structural support skeleton further includes a second plurality of structural connecting portions connecting the reinforcement portion with the plurality of annular bearing support portions.

15. The method according to claim 11, wherein a pair of the first plurality of structural connecting portions extend tangentially from each of a pair of the plurality of annular portions.

16. The method according to claim 15, wherein the pair of the first plurality of structural connecting portions extend diagonally between the pair of the plurality of annular portions.

17. The method according to claim 15, wherein the pair of the first plurality of structural connecting portions are on opposite sides of the pair of the plurality of annular portions.

* * * * *